US009691086B1

United States Patent
Deodhar

(10) Patent No.: US 9,691,086 B1
(45) Date of Patent: Jun. 27, 2017

(54) ADAPTIVE CONTENT RENDERING

(75) Inventor: Girish Deodhar, Cupertino, CA (US)

(73) Assignee: Google Inc., Mountain View, CA (US)

( * ) Notice: Subject to any disclaimer, the term of this patent is extended or adjusted under 35 U.S.C. 154(b) by 469 days.

(21) Appl. No.: 13/107,435

(22) Filed: May 13, 2011

(51) Int. Cl.
| | |
|---|---|
| *G06Q 30/00* | (2012.01) |
| *G06Q 30/02* | (2012.01) |
| *G06Q 10/00* | (2012.01) |
| *G06F 17/20* | (2006.01) |
| *G06F 17/21* | (2006.01) |
| *G06F 3/048* | (2013.01) |
| *G06F 17/30* | (2006.01) |
| *G06F 15/16* | (2006.01) |

(52) U.S. Cl.
CPC ......... *G06Q 30/0277* (2013.01); *G06F 3/048* (2013.01); *G06F 17/20* (2013.01); *G06F 17/21* (2013.01); *G06F 17/30905* (2013.01); *G06Q 10/00* (2013.01); *G06Q 30/00* (2013.01); *G06F 15/16* (2013.01)

(58) Field of Classification Search
CPC ............... G06Q 30/02; G06Q 30/0201; G06Q 30/0277; G06Q 10/0833; G06Q 30/0226; G06Q 30/0242; G06Q 30/0251; G06Q 30/0273; G06Q 30/0276; G06Q 30/00; G06F 17/30377; G06F 17/30902; G06F 3/048; G06F 17/20; G06F 17/30905; H04M 3/567; H04M 7/006
See application file for complete search history.

(56) References Cited

U.S. PATENT DOCUMENTS

| | | | | |
|---|---|---|---|---|
| 5,999,912 A | * | 12/1999 | Wodarz | G06Q 30/02 |
| | | | | 705/14.61 |
| 6,912,311 B2 | * | 6/2005 | Anderson | G06T 11/60 |
| | | | | 358/1.11 |

(Continued)

FOREIGN PATENT DOCUMENTS

| | | | | |
|---|---|---|---|---|
| GB | 2404546 | * | 7/2003 | G06T 15/00 |
| WO | WO 2008/035044 | * | 3/2008 | G06F 17/30 |

(Continued)

OTHER PUBLICATIONS

Endeca Technologies: Endeca Content Assembler, p. Builder Developers Guide, Version 2.1.x (Copyright 2003-2011), Dec. 2011, pp. 1-100.*

(Continued)

*Primary Examiner* — Bijendra K Shrestha
(74) *Attorney, Agent, or Firm* — Fish & Richardson P.C.

(57) ABSTRACT

Methods, systems, and apparatus, including computer programs encoded on a computer-readable storage medium for rendering a content item. A method includes: providing a request to a server computer, the request in the form of a request for a content item to fill a content item slot on a page to be displayed on a client device or a request for search results; receiving, in response to the request, a content item for display on the client device; and initiating the display of the content item including executing a script that identifies a plurality of layout options for the display of the content item, evaluates the plurality of layout options based on one or more criteria, and renders the content item in accordance with one of the plurality of layout options based on the evaluation.

42 Claims, 6 Drawing Sheets

(56) References Cited

U.S. PATENT DOCUMENTS

| | | | | |
|---|---|---|---|---|
| 7,120,868 B2* | 10/2006 | Salesin | ............ | G06F 17/30905 707/E17.121 |
| 7,343,549 B2* | 3/2008 | Ohashi | ................. | G06F 17/248 715/221 |
| 7,380,204 B2* | 5/2008 | Hamelin-Stoupignan | | G06F 17/30893 707/E17.117 |
| 7,627,809 B2* | 12/2009 | Balinsky | ............... | G06F 17/212 707/999.1 |
| 7,765,470 B2* | 7/2010 | Epstein | ................. | G06F 17/212 715/243 |
| 7,814,410 B2* | 10/2010 | Kothari | ............ | G06F 17/30905 715/234 |
| 8,245,132 B2* | 8/2012 | Brown | .................... | G06F 17/24 715/243 |
| 8,249,908 B2* | 8/2012 | Kniaz | ................... | G06Q 30/02 705/14.41 |
| 2003/0004272 A1* | 1/2003 | Power | .................... | H04L 29/06 525/192 |
| 2004/0183756 A1* | 9/2004 | Freitas | ................. | G06F 9/4443 345/73 |
| 2006/0111971 A1* | 5/2006 | Salesin | ................. | G06Q 30/02 705/14.53 |
| 2008/0117448 A1* | 5/2008 | Ijams | ..................... | G06T 11/60 358/1.15 |
| 2008/0306824 A1* | 12/2008 | Parkinson | ............. | G06Q 30/02 705/14.73 |
| 2009/0287572 A1* | 11/2009 | Whelan | .................. | G06Q 30/02 705/14.55 |
| 2012/0278704 A1* | 11/2012 | Ying | ................... | G06F 17/2247 715/243 |

FOREIGN PATENT DOCUMENTS

| | | | | |
|---|---|---|---|---|
| WO | WO 2010/135003 | * | 11/2010 | ............ G06Q 30/00 |
| WO | WO 2014/022658 | * | 2/2014 | ............ G06F 17/00 |

OTHER PUBLICATIONS

Welch et al.: Generating Advertsing Keywords from Video Content, Oct. 2010, ACM, New York, pp. 1-16.*

University of London: Introduction to Rhythmyx, Content Author Training, Vesion 1.0, Jan. 2009, pp. 1-21.*

* cited by examiner

ADAPTIVE CONTENT RENDERING

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for advertisements or other content items to be provided with the resources. For example, a web page can include advertisement slots in which advertisements can be presented. These advertisements slots can be defined in the web page or defined for presentation with a web page, for example, in a pop-up window.

Advertisement slots can be allocated to advertisers through an auction. For example, advertisers can provide bids specifying amounts that the advertisers are respectively willing to pay for presentation of their advertisements ("ads"). In turn, an auction can be performed and the advertisement slots can be allocated to advertisers according, among other things, to their bids and/or the relevance of the advertisement to content presented on a page hosting the slot or a request that is received for the advertisement.

SUMMARY

In general, one innovative aspect of the subject matter described in this specification can be implemented in methods that include a method for rendering a content item. The method comprises: providing a request to a server computer, the request in the form of a request for a content item to fill a content item slot on a page to be displayed on a client device or a request for search results; receiving, in response to the request, a content item for display on the client device; and initiating the display of the content item including executing a script that identifies a plurality of layout options for the display of the content item, evaluates the plurality of layout options based on one or more criteria, and renders the content item in accordance with one of the plurality of layout options based on the evaluation.

These and other implementations can each optionally include one or more of the following features. Providing the request for the content item can include providing a request for an advertisement to be filled in an advertisement slot. The received content item can be an advertisement. The received content item can include search results and the content item. The script can be a JavaScript script associated with the content item. The plurality of layout options can include at least three different layout options. The script that evaluates the plurality of layout options can evaluate each layout option based on one or more signals. The signals can relate to discoverability or visibility of the content item when displayed on the client device. The script that evaluates the plurality of layout options can evaluate, for each option, one or more of font size, color, truncation, geometry of items placed in the content item, justification of text, or placement of items in the content item. The script that evaluates the plurality of layout options can include a script to layout the content item in accordance with a plurality of templates, each including different parameter settings for one or more of font size, color, truncation, geometry of items placed in the content item, justification of text, or placement of items in the content item. The script that evaluates the plurality of layout options can include a script to evaluate a font size for each of the plurality of layout options to determine a layout option that includes a largest possible font size without truncation when rendering the content item on the client device. The script that evaluates the plurality of layout options can include a script to render the content item using each of the plurality of layouts in an invisible area and evaluate each layout option against a configurable metric. The configurable metric can relate to discoverability of the content item when displayed on the client device. The invisible area can be an area of the client device that is not displayed to the user.

In general, another aspect of the subject matter described in this specification can be implemented in methods that include a method for processing a request for a content item. The method comprises: providing a request from a client device to a server computer; receiving in response to the request a content item for display on the client device; identifying a plurality of layout options for the content item, the plurality of layout options including one or more different configurations for parameters that relate to the display of content associated with the content item; evaluating the plurality of layout options based on one or more criteria; and rendering the content item in accordance with one of the plurality of layout options based on the evaluation.

These and other implementations can each optionally include one or more of the following features. Providing the request can include providing a request for an advertisement to be filled in an advertisement slot. The request can be a search request and responsive to the request search results can be received along with the content item. The content item can be an advertisement. The plurality of layout options can include at least three different layout options. Evaluating the plurality of layout options can include executing a script associated with the content item for determining an optimal layout for the content item on the client device. Evaluating the plurality of layout options can include evaluating each layout option based on one or more signals. The signals can relate to discoverability or visibility of the content item when presented on the client device. Evaluating the plurality of layout options can include evaluating, for each layout option, one or more of font size, color, truncation, geometry of items placed in the content item, justification of text, or placement of items in the content item. Evaluating the plurality of layout options can include executing a script on the client device to layout the content item in accordance with a plurality of templates, each including different parameter settings for one or more of font size, color, truncation, geometry of items placed in the content item, justification of text, or placement of items in the content item. Evaluating the plurality of layout options can include executing a script on the client device that evaluates a font size for each of the plurality of layout options to determine an option that includes a largest possible font size without truncation when rendering the content item on the client device. Evaluating the plurality of layout options can include executing a script to render the content item using each of the plurality of layouts in an invisible area and evaluate each layout against a configurable metric. The configurable metric can relate to discoverability of the content item when displayed on the client device. The invisible area can be an area of the client device that is not displayed to the user.

In general, another aspect of the subject matter described in this specification can be implemented in methods that include a method for rendering a content item. The method comprises: receiving a request from a client device, the request in the form of a request for a content item to fill a content item slot on a page to be displayed on a client device or a request for search results; and providing, in response to the request, a content item for display on the client device where the content item includes a script that when executed on the client device identifies a plurality of layout options for the display of the content item, evaluates the plurality of layout options based on one or more criteria, and renders the content item in accordance with one of the plurality of layout options based on the evaluation.

These and other implementations can each optionally include one or more of the following features. Receiving the request for a content item can include receiving a request for an advertisement to be filled in an advertisement slot. The provided content item can be an advertisement. The script can be a JavaScript script associated with the content item. The plurality of layout options can include at least three different layout options. The script that evaluates the plurality of layout options can evaluate each layout option based on one or more signals. The signals can relate to discoverability or visibility of the content item when displayed on the client device. The script that evaluates the plurality of layout options can evaluate, for each option, one or more of font size, color, truncation, geometry of items placed in the content item, justification of text, or placement of items in the content item. The script that evaluates the plurality of layout options can include a script to layout the content item in accordance with a plurality of templates, each including different parameter settings for one or more of font size, color, truncation, geometry of items placed in the content item, justification of text, or placement of items in the content item. The script that evaluates the plurality of layout options can include a script to evaluate a font size for each of the plurality of layout options to determine an option that includes a largest possible font size without truncation when rendering the content item on the client device. The script that evaluates the plurality of layout options can include a script to render the content item using each of the plurality of layouts in an invisible area and evaluate each layout against a configurable metric. The configurable metric can relate to discoverability of the content item when displayed on the client device. The invisible area can be an area of the client device that is not displayed to the user.

Particular implementations may realize none, one or more of the following advantages. A content item can be rendered using a selected candidate layout that more efficiently uses the content item area than other candidate layouts. A content item can be displayed using a layout that increases discoverability and/or visibility of the content item as compared to using a default layout. A content item can be rendered using a layout that enables discoverability and/or visibility of the content item without resulting in the truncation of content included in the content item.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

When a user requests on-line content (e.g., a web page or another online resource), content requests can be initiated to request content from a content publisher for presentation on a user device. For example, content publishers can include publishers of web sites or search engines that are publishing search results responsive to a query. One or more additional content items (e.g., ads) can be provided along with the requested content. As a result, the presented content can be, for example, text, images, audio, video, advertisements (or ads) or other content selected for presentation to the user.

In response to each content request received, content can be served, including one or more ads. A content item received by a user device can include a script which, when executed on the user device identifies multiple layout options for rendering the content item, where each layout option includes different parameter settings for one or more parameters such as font size, color, text justification, and geometry and placement of image or other items included in the content item. The script can evaluate each of the layout options and can select a layout option to be used for rendering of the content item, such as by choosing a layout option that renders the content item to achieve maximum visibility and/or discoverability of the content item (e.g., largest font size without resulting in truncation) as compared to other candidate layout options.

Figure 1:
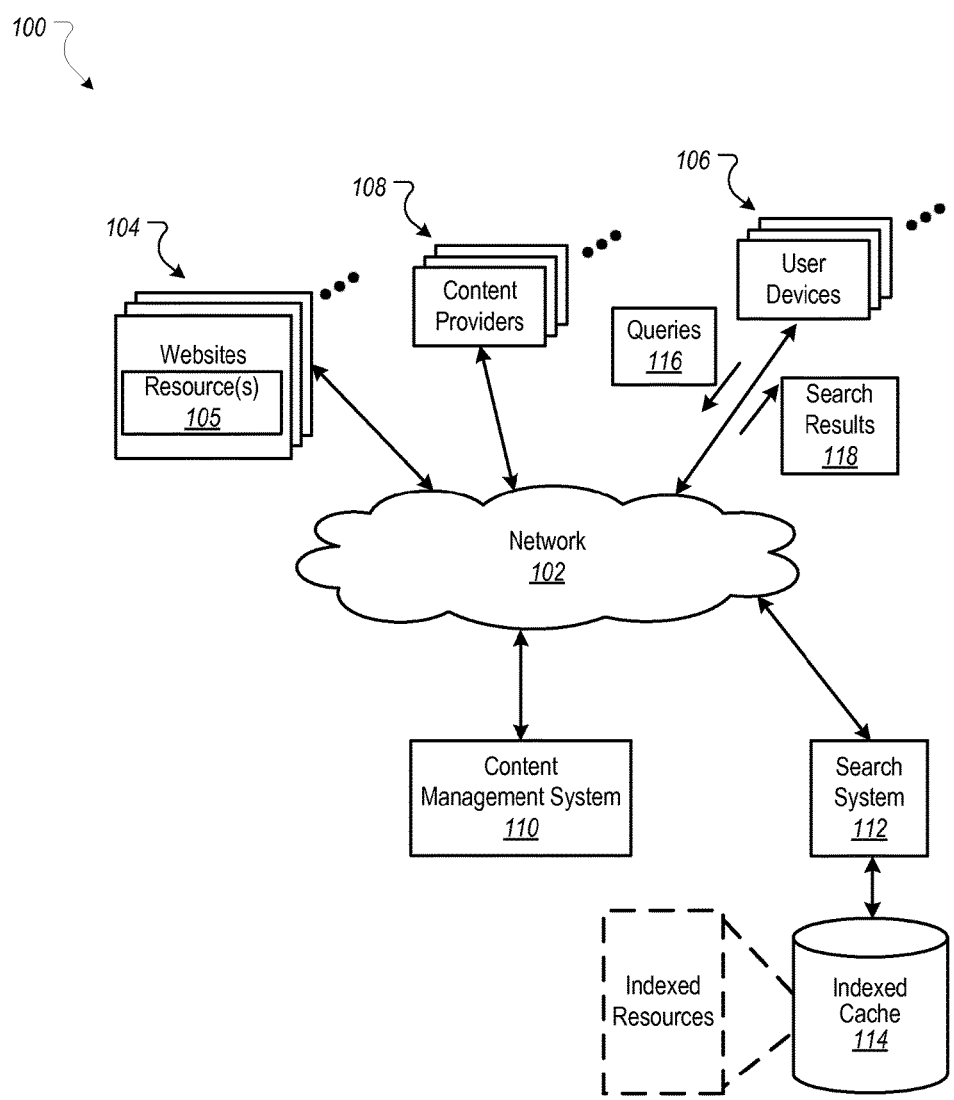
FIG. 1 is a block diagram of an example environment for providing and rendering content.

FIG. 1 is a block diagram of an example environment 100 for providing and rendering content. The example environment 100 includes a content management system 110 that manages content services. The example environment 100 includes a network 102, such as a local area network (LAN), a wide area network (WAN), the Internet, or a combination thereof. The network 102 connects websites 104, user devices 106, content providers 108, and the content management system 110. The example environment 100 may include many thousands of websites 104, user devices 106, and content providers 108.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images and sounds, that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request a resource 105 from a website 104. In turn, data representing the resource 105 can be provided to the user device 106 for presentation by the user device 106. The data representing the resource 105 can also include data specifying a portion of the resource 105 or a portion of a user display, such as a presentation location of a pop-up window or a slot of a third-party content site or web page, in which alternative content (e.g., advertisements) can be presented. These specified portions of the resource 105 or user display can be referred to as content item slots. When the alternative content is an advertisement, the specified portions of the resource 105 or user display can be referred to as advertisement slots.

To facilitate searching of resources, the environment 100 can include a search system 112 that identifies resources by crawling and indexing resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more alternative content slots in which content items (e.g., advertisements) can be presented.

When a resource 105 or search results 118 are requested by a user device 106, the content management system 110 receives a request for one or more content items to be provided with the resource 105 or search results 118. The request for content items can include characteristics of the content item slots that are defined for the requested resource or search results page, and can be provided to the content management system 110.

For example, a reference (e.g., URL) to the resource for which the content item slot is defined, a size of the content item slot, and/or media types that are available for presentation in the content item slot can be provided to the content management system 110. Similarly, keywords associated with a requested resource ("resource keywords") or a search query 116 for which search results are requested can also be provided to the content management system 110 to facilitate identification of content items that are relevant to the resource or search query 116.

Based at least in part on data included in the request for content items, the content management system 110 can select content items that are eligible to be provided in response to the request ("eligible content items"). For example, eligible content items can include content items having characteristics matching the characteristics of content item slots and that are identified as relevant to specified resource keywords or search queries 116. In some implementations, content items having targeting keywords that match the resource keywords or the search query 116 are selected as eligible content items by the content management system 110.

A targeting keyword can match a resource keyword or a search query 116 by having the same textual content ("text") as the resource keyword or search query 116. For example, a content item associated with the targeting keyword "beaches" can be an eligible content item for a content item request including the resource keyword "beaches." Similarly, the content item can be selected as an eligible content item for a content item request including the search query "beaches."

The content management system 110 can select from the eligible content items that are to be provided for presentation in content item slots of a resource or search results page based on results of an auction. For example, the content management system 110 can receive bids from content providers 108 and can allocate the content item slots, based at least in part on the received bids (e.g., based on the highest bidders at the conclusion of the auction). The bids are amounts that the content providers 108 are willing to pay for presentation (or selection) of their content item with a resource or search results page. For example, a bid can specify an amount that a content provider 108 is willing to pay for each 1000 impressions (i.e., presentations) of a content item, referred to as a CPM bid. Alternatively, a bid can specify an amount that the content provider 108 is willing to pay for a selection (i.e., a click-through) of the content item or a "conversion" following selection of the content item. The selected content items can be determined based on the bids alone, or based on the bids of each bidder being multiplied by one or more factors, such as quality scores derived from content item performance, landing page scores, and or other factors.

The content management system 110 can generate one or more scripts and can associate the one or more scripts with the selected content item. The content management system 110 can send the one or more scripts to the user device 106 along with, or as part of the content item, or can otherwise associate the one or more scripts with the content item (e.g., a link to one or more scripts can be included in the content item). The user device 106 can execute the one or more scripts prior to/or in association with rendering the content item on the user device 106.

The one or more scripts can, when executed on the user device 106, identify multiple layout options for rendering the content item on the user device 106, where each layout option includes different parameter settings for one or more parameters such as font size, color, text justification, and geometry and placement of image or other items included in the content item. The one or more scripts can evaluate each of the layout options, such as by rendering each layout option in an invisible area that is not displayed to the user, and can select a layout option to be used for rendering of the content item, such as by choosing a layout option that renders the content item to achieve maximum visibility and/or discoverability of the content item (e.g., largest font size without resulting in truncation) as compared to other candidate layout options. The user device 106 can render the content item using the selected layout option.

Figure 2B:
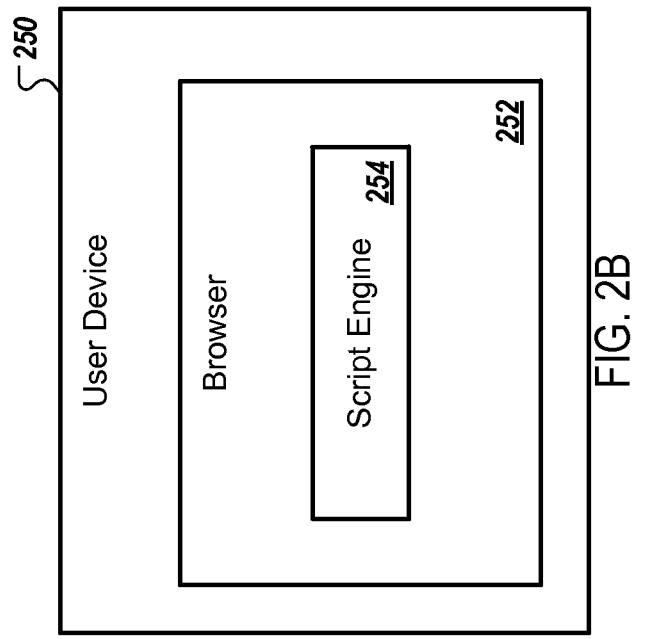
FIG. 2B is a block diagram of a user device.
Figure 2A:
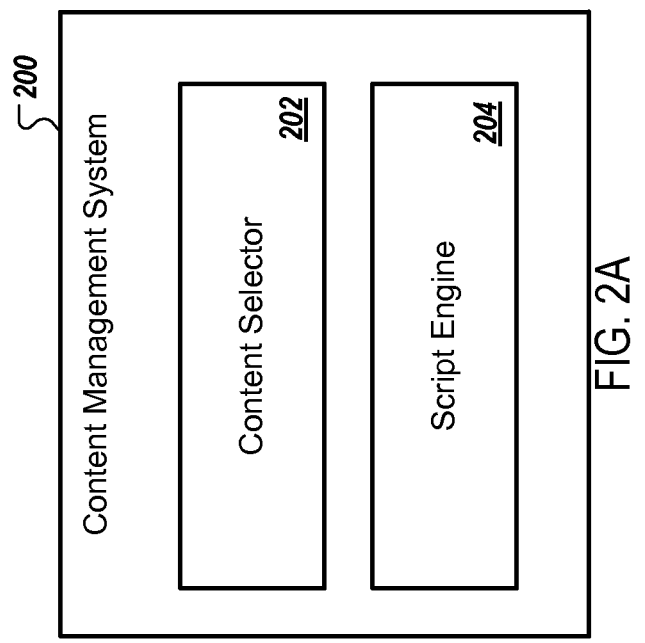
FIG. 2A is a block diagram of a content management system.

FIG. 2A is a block diagram of a content management system 200. The content management system 200 can, for example, be the content management system 110 described previously with respect to FIG. 1. The content management system 200 includes a content selector 202 and a script engine 204. The content selector 202 can select a content item based on a received request for a content item. For example, the content selector 202 can select a content item based on one or more targeting keywords, based on the result of an auction, or based on one or more search keywords, to name a few examples.

The script engine 204 can generate one or more scripts or can identify one or more previously generated scripts in response to receiving a request for a content item. The script engine can, for example, generate or identify one or more JavaScript scripts. The script engine 204 can include the one or more scripts in a content item that is provided in response to a request for a content item. For example, the script engine 204 can embed JavaScript code in a content item. As another example, the script engine 204 can associate one or more scripts with the content item, such as by including a link to one or more scripts in the content item. The link to the one or more scripts can refer, for example, to script code managed by the script engine 204 or managed by some other entity.

The one or more scripts generated by the script engine 204 can, when executed on a user device, identify a set of (e.g., three or more) layout options for the selected content item, where each layout option includes one or more different configurations for parameters that relate to the display of content associated with the content item. The script can also evaluate each layout option based on one or more criteria, such as how each layout option affects discoverability and/or visibility of the content item, and can render the content item using a selected layout option.

FIG. 2B is a block diagram of a user device 250. The user device 250 can be, for example, the user device 106 described previously with respect to FIG. 1. The user device 250 includes a browser 252. The browser 252 can request a resource over a network and can render the resource for presentation to the user of the user device 250. The browser 252 includes a script engine 254. The script engine 254 can execute a script, such as a JavaScript script. The script engine can execute, for example, JavaScript code that is included in or linked from a received content item. As described above, the script engine 254 can execute a script generated by a content management system (e.g., the content management system 200) to identify a set of candidate layout options, evaluate the candidate layout options, and render a received content item using a selected layout option.

Figure 3:
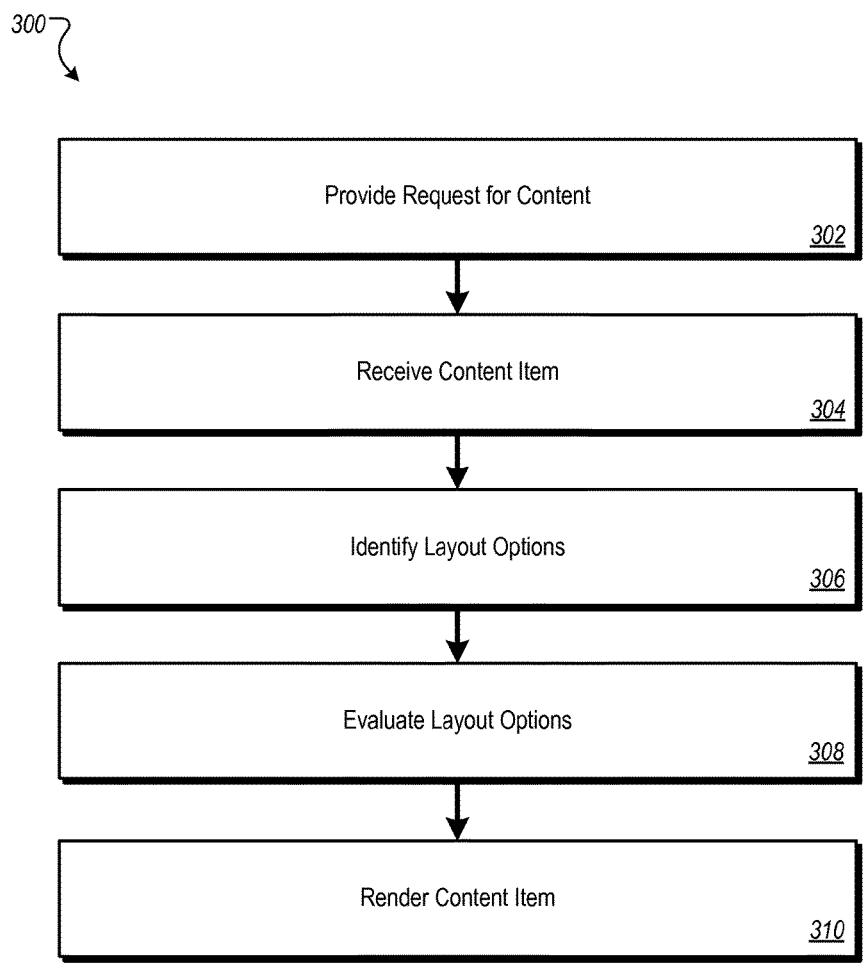
FIG. 3 is a flowchart of an example process for rendering a content item.

FIG. 3 is a flowchart of an example process 300 for rendering a content item. The process 300 can be performed, for example, by the user device 106. A request is provided from a client device to a server computer (302). For example and referring to FIG. 1, the user device 106 can send a request to the content management system 110 to provide a content item (e.g., an advertisement) for a content item slot (e.g., an advertisement slot) in a web page 104 that corresponds to a resource 105. As another example, the request can be a query 116 (e.g., a search request).

A content item is received, in response to the request, for display on the client device (304). The content item can be, for example, an advertisement. For example and referring to FIG. 1, the user device 106 can receive a content item (e.g., advertisement) from the content management system 110. For example, if the request is a query 116, a content item (e.g., an advertisement) can be received by the user device for a content item slot (e.g., an advertisement slot) included in a search result page that includes search results 118.

As another example, the content management system 110 can identify a content item that is relevant to a third-party web site 104 and can send the identified content item to the user device 106. For example, if the website 104 is related to beaches or waterfronts, then the content management system 110 can identify a content item that is related to a beach-related product or service. In some implementations, the identification process can use keywords (e.g., "beaches") that correspond to the user's query for content. In some implementations, the content management system 110 can identify content items that are targeted to the user. For example, if the user is known to live in the Carmel area of California, or if the GPS location of the user's mobile computing device indicates that the user is currently in that area, then the content management system 110 can identify a content item for a Carmel area beach.

A plurality of layout options for the content item are identified, where the plurality of layout options includes one or more different configurations for parameters that relate to the display of content associated with the content item (306). For example, three or more different layout options can be identified. The plurality of layout options can be identified and particular parameter settings for a given layout option can be selected by a script that executes on the client device. For example, the content management system 110 can generate the script and can associate the script with the content item that is received by the user device 106. The user device 106 can execute the script. For example, the script can be a JavaScript script, and a script engine of a browser can execute the script on the user device 106.

The parameters that relate to the display of content associated with the content item can include, for example, font size, background color, foreground color, font face, justification of text, and geometry and/or placement of items placed in the content item. Items placed in the content item can include, for example, one or more images and one or more text items. For example, a content item can include a title text item, a body text item, and a link text item. For each of the title, body, and link text items, a text justification parameter can specify a left, right, or center justification. A first layout option, for example, can specify left justification for title and body text items and a center justification for a link text item, and a second layout option can specify center justification for each of the title, body, and link text items.

A content item can include, for example, three images. An image included in a content item can be, for example, a control, an icon, a badge, or some other image. For each image, an image-placement parameter included in a layout option can indicate whether the image is to be placed, for example, in an upper-left, center-top, upper-right, lower-right, center-bottom, or lower-right region of the content item. For example, a first layout option can specify that all images included in the content item are to be placed in a lower-left region of the content item. As another example, a second layout option can specify that a first image is to be placed in an upper-right region of the content item and that a second image and a third image are to be placed in a lower-left region of the content item.

A geometry of an item placed in the content item can be specified, for example, if one or more of the items included in the content item are controls. For example, for a button control, a corresponding control image can be a rectangle, an oval, a circle, a text link, or a rounded rectangle. A first layout option can specify, for example, that rectangle control images are to be used for controls placed in the content item. As another example, a second layout option can specify that oval control images are to be used for controls placed in the content item. As another example, a third layout option can specify that rectangle control images of a first size are to be used for controls placed in the content item and a fourth layout option can specify that rectangle control images of a second, larger size are to be used for controls placed in the content item.

The identification of layout options can be based on one or more parameters that are related to the display of content associated with a web page that includes a content item slot in which the content item is to be rendered. For example, the content item can be an advertisement to be included in an advertisement slot included in a web page. The identification of layout options can be based on one or more parameters that are related to the display of content included in the web page (e.g., content other than content associated with the content slot). For example, the identification of layout options can be based on a font-size, web page background color, text foreground color, or font face used for the display of content of the web page. The identification of particular parameter settings can be based on discoverability or visibility of the content item in a context of being included in a content item slot included among other content of the web page.

As a more detailed example, suppose that the web page includes content displayed in an Arial ten-point font, that the background color of the web page is black, and that the text foreground color of the web page is white. A first layout option can be identified that includes a font size of twelve points, a background color of black, and a text foreground color of white. The font-size of twelve points can be selected, for example, because a font size of twelve points can increase visibility and discoverability of the text of the content item as compared to ten-point text of the web page. The background color of black can be selected to match the background color of the web page. The text foreground color of white can be selected based on a determination of white being a color that is visible on a black background.

Continuing the above example, a second layout option can be identified that includes a font size of fourteen points, a background color of black, and a text foreground color of yellow. The font-size of fourteen points can be selected, for example, because a font size of fourteen points can increase visibility and discoverability of the text of the content item as compared to ten-point text of the web page and as compared to twelve-point text specified for the first layout option. As described in more detail below, however, a larger text size can result in truncation. The text foreground color of yellow can be selected, for example, based on a determination of yellow being a color that is visible on a black background.

In some implementations, a default layout option can be identified. For example, a default layout option can be generated by the server computer, can be associated with the content item, and can be received by the client device. The default layout option can include parameter settings, such as font size, which are selected to result in a safe display of the content item on any one of a multitude of different client devices having various display settings. For example, the default layout option can include a font size setting which can result in the display of the content item without truncation on all client devices having at least a particular display resolution.

The plurality of layout options are evaluated based on one or more criteria (308). The plurality of layout options can be evaluated, for example, by executing a script associated with the content item. The script for evaluating the plurality of layout options can be the same script as the script used to identify the plurality of layout options, or can be a different script.

Each criteria can be based, for example, on a signal or configurable metric. A signal or configurable metric can relate, for example, to discoverability or visibility of the content item when presented on the client device. For example, signals can relate to font size, color, geometry of items placed in the content item, justification of text, or placement of items in the content item. The script can determine a score for each criteria for each of the plurality of layout options. The script can sum the scores for each layout option and can determine an optimal layout option from the plurality of layout options based on which layout option has the highest total score.

In some implementations, the script can render the content item using each of the plurality of layouts in an invisible area (e.g., an area of the client device that is not displayed to the user) and can evaluate the layout option according to the rendering of the content item in the invisible area. For example, the script can determine, for each layout option, an amount of white spaced included in the rendered content item. A score for a whitespace criteria can be determined for a layout option based on a difference between the whitespace associated with the layout option and an optimal whitespace amount. For example, an optimal whitespace amount can be identified as a whitespace amount of forty percent (e.g., whitespace less than forty percent might be associated with a content item that is too "crowded" and whitespace greater than forty percent might be associated with a content item that includes "wasted space"). If a layout option has an associated whitespace amount of forty percent, for example, an associated whitespace criteria score can be ten out of a possible ten points. If a layout option has, for example, an associated whitespace amount of either fifty or thirty percent, an associated whitespace criteria score can be seven out of a possible ten points. If a layout option has, for example, an associated whitespace amount of sixty or twenty percent, an associated whitespace criteria score can be five out of a possible ten points.

Other criteria scores can be determined for other types of criteria, for each layout option. For example, criteria scores can be assigned based on a determined visibility of the content item based on foreground or background color of the layout option in consideration of foreground and background color of surrounding content. As another example, a criteria score can be generated based on font size specified by the layout option.

In some implementations, the script can evaluate each of the layout options to determine a layout option that includes a largest possible font size that does not result in truncation of text when rendering the content item on the client device. A font size criteria score can be based on a largest font size resulting in no truncation, for layout options whose font sizes do not result in truncation. For example, if three layout options having font sizes of ten, twelve, and fourteen each result in no truncation when the content item is rendered using a respective layout option, respective font size criteria scores can be six, eight, and ten, out of a possible ten points (e.g., the layout option having the largest font size resulting in no truncation can receive a score of ten out of ten and layout options having smaller font sizes can receive smaller, prorated scores based on the difference in font size as compared to the largest font size resulting in no truncation). In some implementations, a layout option that results in truncation can be assigned a score of zero for a font-size criteria. As described in more detail below, in some implementations, a layout option that results in truncation can be assigned a "fail" score for a font-size criteria and/or for an overall criteria.

Multiple layout options having the same font size can be evaluated. For example, multiple layout options having the same font size but having different text justification options can be evaluated. As another example, multiple layout options having the same font size but having different geometry or placement of items (e.g., images) in the content item can be evaluated. Multiple layout options of various combinations of different parameter settings can be evaluated and it can be determined for each layout option whether truncation of text occurs when the content item is rendered in the invisible area using the layout option.

The content item is rendered in accordance with one of the plurality of layout options based on the evaluation (310). For example and referring to FIG. 1, the content item can be rendered on the user device 106. The content item can be rendered, for example, on the user device 106 using a layout option that has a highest associated score as determined by the evaluation.

In some implementations, a result of the evaluation can be that one or more layout options are excluded from further consideration for use in rendering the content item. For example, in some implementations, a layout option that results in truncation can be excluded from further consideration as a candidate layout option to use for rendering of the content item. That is, some evaluation criteria can be treated as "pass/fail" criteria, where if a layout option has failed a particular criteria (e.g., the layout option would result in truncation of text), then that layout option is no longer considered for use in rendering of the content item. In some implementations, a default layout option may be selected and may be used in rendering of the content item if all other layout options have failed one or more "pass/fail" criteria.

In some implementations, if a default layout option is selected, pre-rendered content can be displayed on the client device. For example, the received content item can be or can include a pre-rendered content item, or a pre-rendered content item can be received in association with the content item. In some implementations, a default layout option is adjusted based on the evaluation of the plurality of layout options, and the adjusted default layout option is used in rendering the content item on the client device.

Figure 4:
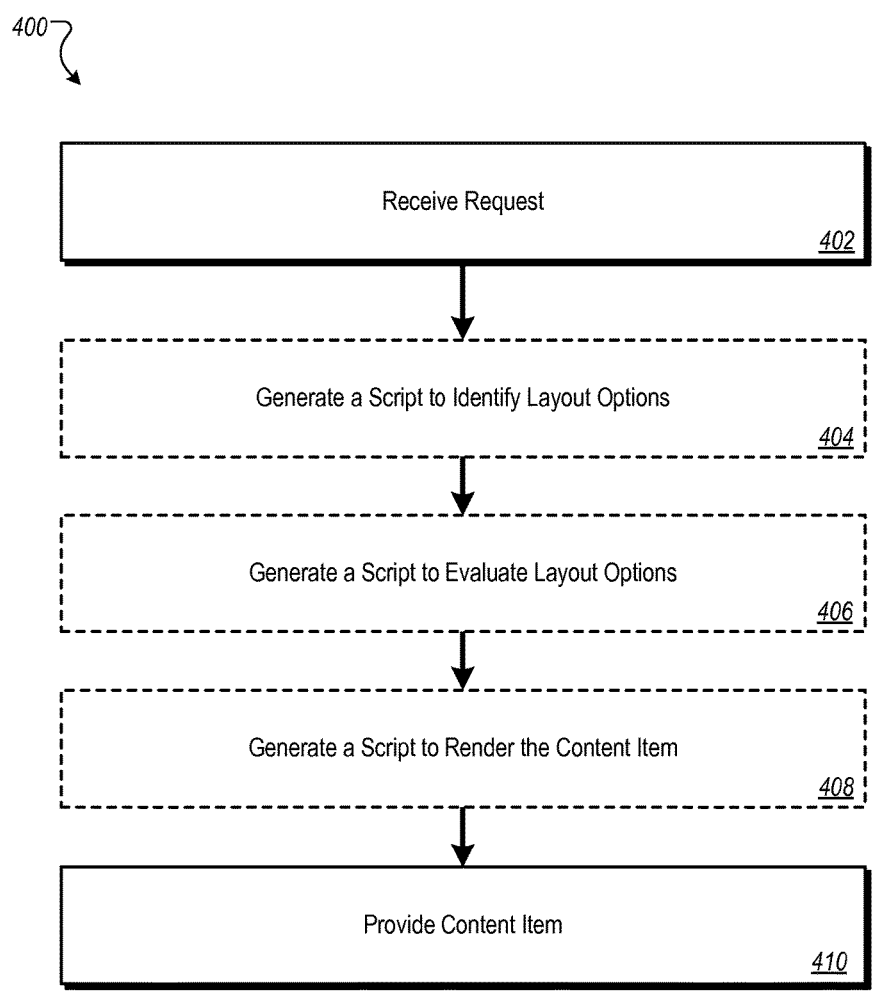
FIG. 4 is a flowchart of an example process for processing a request for a content item.

FIG. 4 is a flowchart of an example process 400 for processing a request for a content item. The process 400 can be performed, for example, by the content management system 110. A request is received from a client device (402), where the request is in the form of a request for a content item to fill a content item slot on a page to be displayed on a client device or a request for search results. For example and referring to FIG. 1, a request can be received by the content management system 110 from the user device 106.

A script is generated that when executed on the client device identifies a plurality of layout options for the display of the content item (404). The script can be generated, for example, by the content management system 110. The script can be executed, for example, on the user device 106. The identification of layout options can be similar to the identification of layout options described above with respect to FIG. 3.

A script is generated that when executed on the client device evaluates the plurality of layout options based on one or more criteria (406). The script can be the same script as the script generated in step 404 or can be a different script. The script can be generated, for example, by the content management system 110 and can be executed by the user device 106. The evaluation of layout options can be similar to the evaluation of layout options described above with respect to FIG. 3.

A script is generated that when executed on the client device renders the content item in accordance with one of the plurality of layout options based on the evaluation (408). The script can be the same script as the script generated in step 404 and/or step 406 or can be a different script. The script can be generated, for example, by the content management system 110 and can be executed by the user device 106. The script can, as described above, select a layout option that results in the best discoverability and/or visibility of the content item, as determined by the evaluation of layout options.

A content item is provided, in response to the request, for display on the client device (410). For example, the content management system 110 can provide the content item to the user device 106 and the content item can include or refer to the one or more scripts generated in steps 404, 406, and 408.

Figure 5:
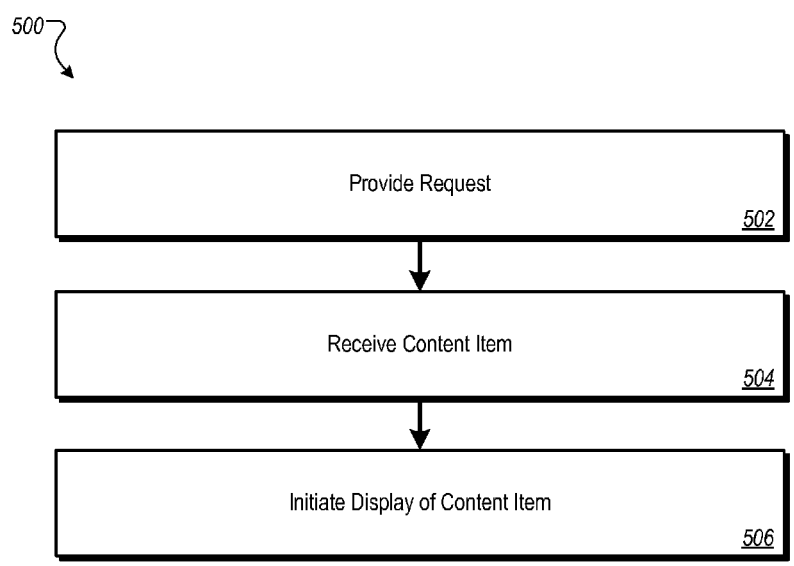
FIG. 5 is a flowchart of an example process for rendering a content item.

FIG. 5 is a flowchart of an example process 500 for rendering a content item. The process 500 can be performed, for example, by the user device 106. A request is provided to a server computer (502), in the form of a request for a content item to fill a content item slot on a page to be displayed on a client device or a request for search results. For example, the user device 106 can provide a request to the content management system 100 for an advertisement to be included in an advertisement slot. A content item is received, in response to the request, for display on the client device (504). For example, the user device 106 can receive a content item from the content management system 110.

The display of the content item is initiated (506). For example, referring to FIG. 1, the user device 106 can execute a script that identifies a plurality of layout options for the display of the content item, evaluates the plurality of layout options based on one or more criteria, and renders the content item in accordance with one of the plurality of layout options based on the evaluation. The identification of layout options, the evaluation of layout options, and the rendering of the content item can be similar to the identification, evaluation, and rendering described above with respect to FIG. 3.

Figure 6:
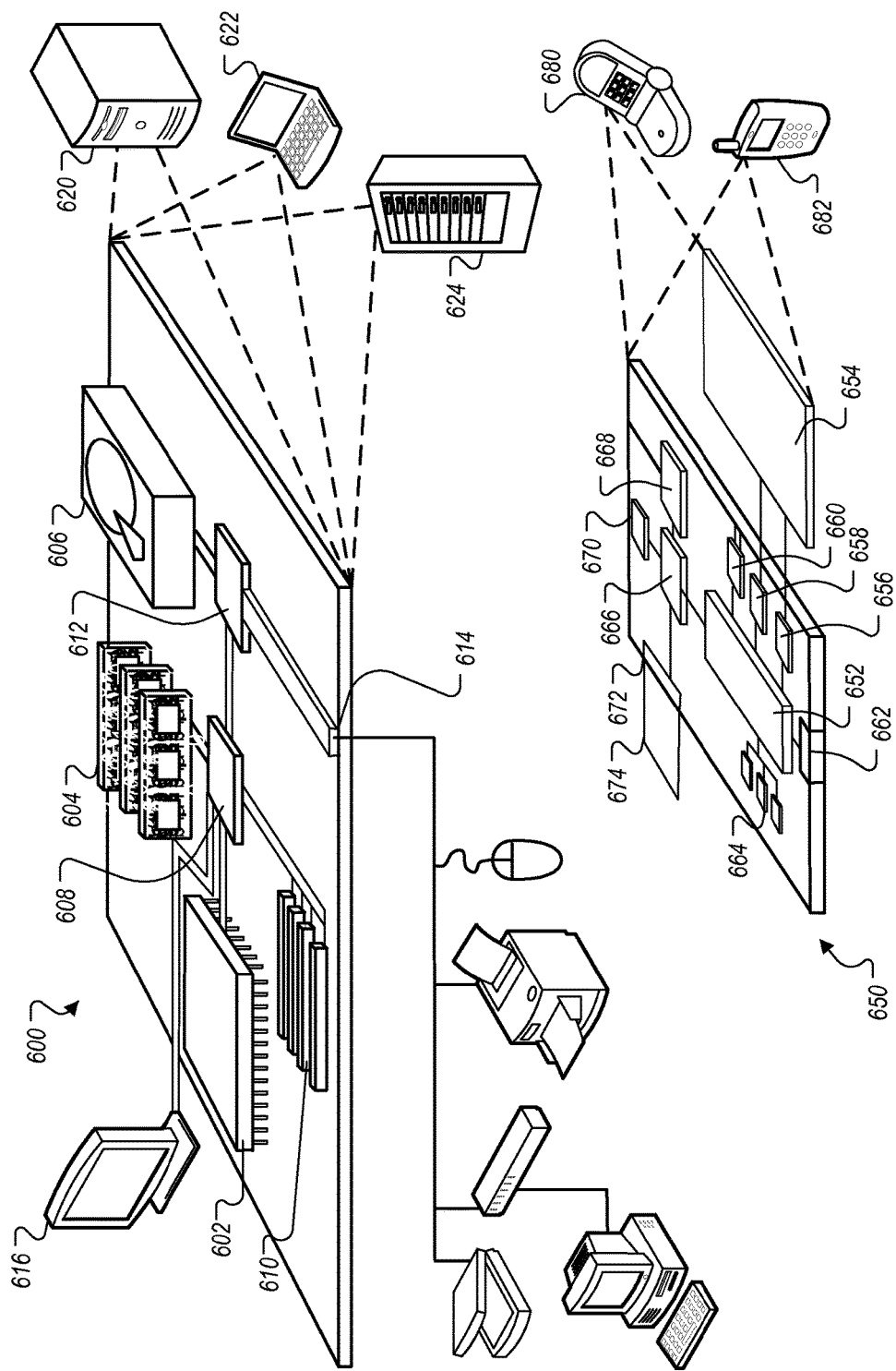
FIG. 6 is a block diagram of an example computer system that can be used to implement the methods, systems and processes described in this disclosure.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described.

Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

providing, to a server computer, a request for a content item selected by the server computer, the request including one or more characteristics of a content item slot on a page being rendered by a client device that includes one or more processors and a display in which content is visually presented;

receiving, at the client device and in response to the request, the selected content item, a script that facilitates client-side modification of display of the content item by the client device, and a default layout option that includes one or more parameter settings that are selected by the server computer for display of the selected content item on a plurality of different client devices having a plurality of different display settings; and at the client device, executing the script including:

identifying, by the client device, one or more page parameters outside of the content item slot, wherein the one or more page parameters include one or more of a page font size, a page text foreground color, or a page background color;

identifying, by the client device, a plurality of different layout options that affect display of the content item in the content item slot on the page, wherein identifying one or more of the plurality of different layout options is based at least in part on the one or more page parameters and includes selecting one or more content item parameters that affect a visible aspect of the content item with regard to the page;

identifying, by the client device, the default layout option;

rendering, at a location in an area of the page that is not presented in the display of the client device while another area of the page presents other content in the display, the content item according to each of the plurality of different layout options and the default layout option, wherein the rendered content item is not visible in the display of the client device;

evaluating, by the client device, visual aspects of the content item as presented at the client device in each of the plurality of different layout options and the default layout option based on the rendering of the content item at the location in the area of the page that is not presented in the display of the client device and one or more criteria related to visibility of the content item with regard to the other area of the page that presents other content, wherein evaluating visual aspects of the content item in each of the plurality of different layout options includes, for each of the plurality of different layout options, determining a criteria score for each of the one or more criteria and determining a layout score for the layout option based on an aggregate criteria score for the one or more criteria;

adjusting, by the client device, the default layout option, based on the evaluating;

selecting, by the client device, a layout option from the plurality of different layout options and the adjusted default layout option based at least in part on the layout score for the layout option, wherein the adjusted default layout option is selected when each of the plurality of different layout options have not met one or more criteria related to visibility of the content item with regard to the page; and relocating and displaying, by the client device, a formatted version of the content item to the content item slot on the page that is presented in the display of the client device, wherein the formatted version of the content item is formatted in accordance with the layout option selected from the plurality of different layout options and the adjusted default layout option, wherein the relocating and displaying is performed after the rendering, evaluating, and selecting are performed by the client device.

2. The method of claim 1 wherein providing the request for the content item includes providing a request for an advertisement.

3. The method of claim 2 wherein the received content item is an advertisement.

4. The method of claim 1 wherein the received content item includes search results and the content item.

5. The method of claim 1 wherein the script is a JavaScript script that is associated with the content item.

6. The method of claim 1 wherein the plurality of different layout options includes at least three different layout options.

7. The method of claim 1 wherein evaluating visual aspects of the content item as presented in each of the plurality of different layout options includes evaluating each layout option based on one or more signals.

8. The method of claim 7 wherein the signals relate to discoverability or visibility of the content item when presented in the display of the client device.

9. The method of claim 1 wherein evaluating visual aspects of the content item as presented in each of the plurality of different layout options includes evaluating, for each layout option, one or more of font size, color, truncation, geometry of items placed in the content item, justification of text, or placement of items in the content item.

10. The method of claim 1 wherein evaluating visual aspects of the content item as presented in each of the plurality of different layout options includes laying out the content item in accordance with a plurality of templates, each including different parameter settings for one or more of font size, color, truncation, geometry of items placed in the content item, justification of text, or placement of items in the content item.

11. The method of claim 1 wherein evaluating visual aspects of the content item as presented in each of the plurality of different layout options includes evaluating a font size for each of the plurality of different layout options to determine a layout option that includes a largest possible font size without truncation when rendering the content item on the client device.

12. The method of claim 1 wherein evaluating visual aspects of the content item as presented in each of the plurality of different layout options includes evaluating each layout option against a configurable metric.

13. The method of claim 12 wherein the configurable metric relates to discoverability of the content item when presented in the display of the client device.

14. A system comprising:

one or more data processing apparatus; and a data storage device storing instructions that, when executed by the one or more data processing apparatus, cause the one or more data processing apparatus to perform operations comprising:

providing, to a server computer, a request for a content item selected by the server computer, the request including one or more characteristics of a content item slot on a page being rendered by a client device that includes one or more processors and a display in which content is visually presented;

receiving, at the client device and in response to the request, the selected content item, a script that facilitates client-side modification of display of the content item by the client device, and a default layout option that includes one or more parameter settings that are selected by the server computer for display of the selected content item on a plurality of different client devices having a plurality of different display settings; and at the client device, executing the script including:

identifying, by the client device, one or more page parameters outside of the content item slot, wherein the one or more page parameters include one or more of a page font size, a page text foreground color, or a page background color;

identifying, by the client device, a plurality of different layout options that affect display of the content item in the content item slot on the page, wherein identifying one or more of the plurality of different layout options is based at least in part on the one or more page parameters and includes selecting one or more content item parameters that affect a visible aspect of the content item with regard to the page;

identifying, by the client device, the default layout option;

rendering, at a location in an area of the page that is not presented in the display of the client device while another area of the page presents other content in the display, the content item according to each of the plurality of different layout options and the default layout option, wherein the rendered content item is not visible in the display of the client device;

evaluating, by the client device, visual aspects of the content item as presented at the client device in each of the plurality of different layout options and the default layout option based on the rendering of the content item at the location in the area of the page that is not presented in the display of the client device and one or more criteria related to visibility of the content item with regard to the other area of the page that presents other content, wherein evaluating visual aspects of the content item in each of the plurality of different layout options includes, for each of the plurality of different layout options, determining a criteria score for each of the one or more criteria and determining a layout score for the layout option based on an aggregate criteria score for the one or more criteria;

adjusting, by the client device, the default layout option, based on the evaluating; selecting, by the client device, a layout option from the plurality of different layout options and the adjusted default layout option based at least in part on the layout score for the layout option, wherein the adjusted default layout option is selected when each of the plurality of different layout options have not met one or more criteria related to visibility of the content item with regard to the page; and relocating and displaying, by the client device, a formatted version of the content item to the content item slot on the page that is presented in the display of the client device, wherein the formatted version of the content item is formatted in accordance with the layout option selected from the plurality of different layout options and the adjusted default layout option, wherein the relocating and displaying is performed after the rendering, evaluating, and selecting are performed by the client device.

15. The system of claim 14 wherein providing the request for the content item includes providing a request for an advertisement.

16. The system of claim 15 wherein the received content item is an advertisement.

17. The system of claim 14 wherein the received content item includes search results and the content item.

18. The system of claim 14 wherein the script is a JavaScript script that is associated with the content item.

19. The system of claim 14 wherein the plurality of different layout options includes at least three different layout options.

20. The system of claim 14 wherein evaluating visual aspects of the content item as presented in each of the plurality of different layout options includes evaluating each layout option based on one or more signals.

21. The system of claim 20 wherein the signals relate to discoverability or visibility of the content item when presented in the display of the client device.

22. The system of claim 14 wherein evaluating visual aspects of the content item as presented in each of the plurality of different layout options includes evaluating, for each layout option, one or more of font size, color, truncation, geometry of items placed in the content item, justification of text, or placement of items in the content item.

23. The system of claim 14 wherein evaluating visual aspects of the content item as presented in each of the plurality of different layout options includes laying out the content item in accordance with a plurality of templates, each including different parameter settings for one or more of font size, color, truncation, geometry of items placed in the content item, justification of text, or placement of items in the content item.

24. The system of claim 14 wherein evaluating visual aspects of the content item as presented in each of the plurality of different layout options includes evaluating a font size for each of the plurality of different layout options to determine a layout option that includes a largest possible font size without truncation when rendering the content item on the client device.

25. The system of claim 14 wherein evaluating visual aspects of the content item as presented in each of the plurality of different layout options includes evaluating each layout option against a configurable metric.

26. The system of claim 25 wherein the configurable metric relates to discoverability of the content item when presented in the display of the client device.

27. A non-transitory computer readable medium storing instructions that, when executed by one or more data processing apparatus, cause the one or more data processing apparatus to perform operations comprising:

providing, to a server computer, a request for a content item selected by the server computer, the request including one or more characteristics of a content item slot on a page being rendered by a client device that includes one or more processors and a display in which content is visually presented;

receiving, at the client device and in response to the request, the selected content item, a script that facilitates client-side modification of display of the content item by the client device, and a default layout option that includes one or more parameter settings that are selected by the server computer for display of the selected content item on a plurality of different client devices having a plurality of different display settings; and at the client device, executing the script including:

identifying, by the client device, one or more page parameters outside of the content item slot, wherein the one or more page parameters include one or more of a page font size, a page text foreground color, or a page background color;

identifying, by the client device, a plurality of different layout options that affect display of the content item in the content item slot on the page, wherein identifying one or more of the plurality of different layout options is based at least in part on the one or more page parameters and includes selecting one or more content item parameters that affect a visible aspect of the content item with regard to the page;

identifying, by the client device, the default layout option;

rendering, at a location in an area of the page that is not presented in the display of the client device while another area of the page presents other content in the display, the content item according to each of the plurality of different layout options and the default layout option, wherein the rendered content item is not visible in the display of the client device;

evaluating, by the client device, visual aspects of the content item as presented at the client device in each of the plurality of different layout options and the default layout option based on the rendering of the content item at the location in the area of the page that is not presented in the display of the client device and one or more criteria related to visibility of the content item with regard to the other area of the page that presents other content, wherein evaluating visual aspects of the content item in each of the plurality of different layout options includes, for each of the plurality of different layout options, determining a criteria score for each of the one or more criteria and determining a layout score for the layout option based on an aggregate criteria score for the one or more criteria;

adjusting, by the client device, the default layout option, based on the evaluating; selecting, by the client device, a layout option from the plurality of different layout options and the adjusted default layout option based at least in part on the layout score for the layout option, wherein the adjusted default layout option is selected when each of the plurality of different layout options have not met one or more criteria related to visibility of the content item with regard to the page; and relocating and displaying, by the client device, a formatted version of the content item to the content item slot on the page that is presented in the display of the client device, wherein the formatted version of the content item is formatted in accordance with the layout option selected from the plurality of different layout options and the adjusted default layout option, wherein the relocating and displaying is performed after the rendering, evaluating, and selecting are performed by the client device.

28. The computer readable medium of claim 27 wherein providing the request for the content item includes providing a request for an advertisement.

29. The computer readable medium of claim 28 wherein the received content item is an advertisement.

30. The computer readable medium of claim 27 wherein the received content item includes search results and the content item.

31. The computer readable medium of claim 27 wherein the plurality of different layout options includes at least three different layout options.

32. The computer readable medium of claim 27 wherein evaluating visual aspects of the content item as presented in each of the plurality of different layout options includes evaluating each layout option based on one or more signals.

33. The computer readable medium of claim 32 wherein the signals relate to discoverability or visibility of the content item when presented in the display of the client device.

34. The computer readable medium of claim 27 wherein evaluating visual aspects of the content item as presented in each of the plurality of different layout options includes evaluating, for each layout option, one or more of font size, color, truncation, geometry of items placed in the content item, justification of text, or placement of items in the content item.

35. The computer readable medium of claim 27 wherein evaluating visual aspects of the content item as presented in each of the plurality of different layout options includes laying out the content item in accordance with a plurality of templates, each including different parameter settings for one or more of font size, color, truncation, geometry of items placed in the content item, justification of text, or placement of items in the content item.

36. The computer readable medium of claim 27 wherein evaluating visual aspects of the content item as presented in each of the plurality of different layout options includes evaluating a font size for each of the plurality of different layout options to determine a layout option that includes a largest possible font size without truncation when rendering the content item on the client device.

37. The computer readable medium of claim 27 wherein evaluating visual aspects of the content item as presented in each of the plurality of different layout options includes evaluating each layout option against a configurable metric.

38. The computer readable medium of claim 27 wherein the configurable metric relates to discoverability of the content item when presented in the display of the client device.

39. The method of claim 1 wherein identifying the plurality of different layout options that affect display of the content item in the content item slot on the page includes identifying a layout option in which a content item font size is selected that is different from the page font size.

40. The method of claim 1 wherein identifying the plurality of different layout options that affect display of the content item in the content item slot on the page includes identifying a layout option in which a content item background color is selected that matches or complements the page background color.

41. The method of claim 40 wherein identifying the plurality of different layout options that affect display of the content item in the content item slot on the page includes identifying a layout option in which a content item text foreground color is selected that is visible on the content item background color that matches or complements the page background color.

42. The method of claim 1 wherein identifying the plurality of different layout options that affect display of the content item in the content item slot on the page includes selecting a different content item font size for two or more of the plurality of different layout options; and wherein evaluating visual aspects of the content item in each of the plurality of layout options includes:
for each of the plurality of layout options that do not result in truncation, determining a font size criteria score that is proportional to the content item font size; and
for each of the plurality of layout options that do result in truncation, determining a minimum layout score for the layout option.

* * * * *